United States Patent [19]

Finney

[11] Patent Number: 4,767,468

[45] Date of Patent: Aug. 30, 1988

[54] THERMOCOUPLE ASSEMBLY

[76] Inventor: Philip F. Finney, 425 East Washington, Villa Park, Ill. 60181

[21] Appl. No.: 626,969

[22] Filed: Jul. 2, 1984

[51] Int. Cl.$^4$ .......................................... H01L 35/02
[52] U.S. Cl. ..................................... 136/233; 136/229
[58] Field of Search ............................... 136/229–233, 136/201, 242; 374/163–165, 179; 165/11 R, 32; 29/573, 592 R

[56] References Cited

U.S. PATENT DOCUMENTS

| | | | |
|---|---|---|---|
| 3,874,239 | 4/1975 | Finney | 136/230 |
| 4,164,433 | 8/1979 | Granahan | 136/229 |
| 4,338,479 | 7/1982 | Bauman | 136/229 |
| 4,477,687 | 10/1984 | Finney | 136/233 |

Primary Examiner—Barry S. Richman
Assistant Examiner—T. J. Wallen
Attorney, Agent, or Firm—Edmond T. Patnaude

[57] ABSTRACT

A thermocouple assembly for attachment to surfaces by welding which includes a solid metal head formed with a knife edge and receiving sheathed thermocouple conductors, the ends of which are disposed at the knife edge and are junction welded. The head is economically fabricated on a mass-production basis, and the sheathed conductors are attached in a simple manner to minimize the overall production costs of the assembly. The disposition of the junction and the connection between the sheath and the solid head coacts with the weldments mounting the assembly on a surface to control the heat energy path such that the effective junction permits the junction to accurately function with respect to sensing the temperature of the surface on which the assembly is mounted.

17 Claims, 2 Drawing Sheets

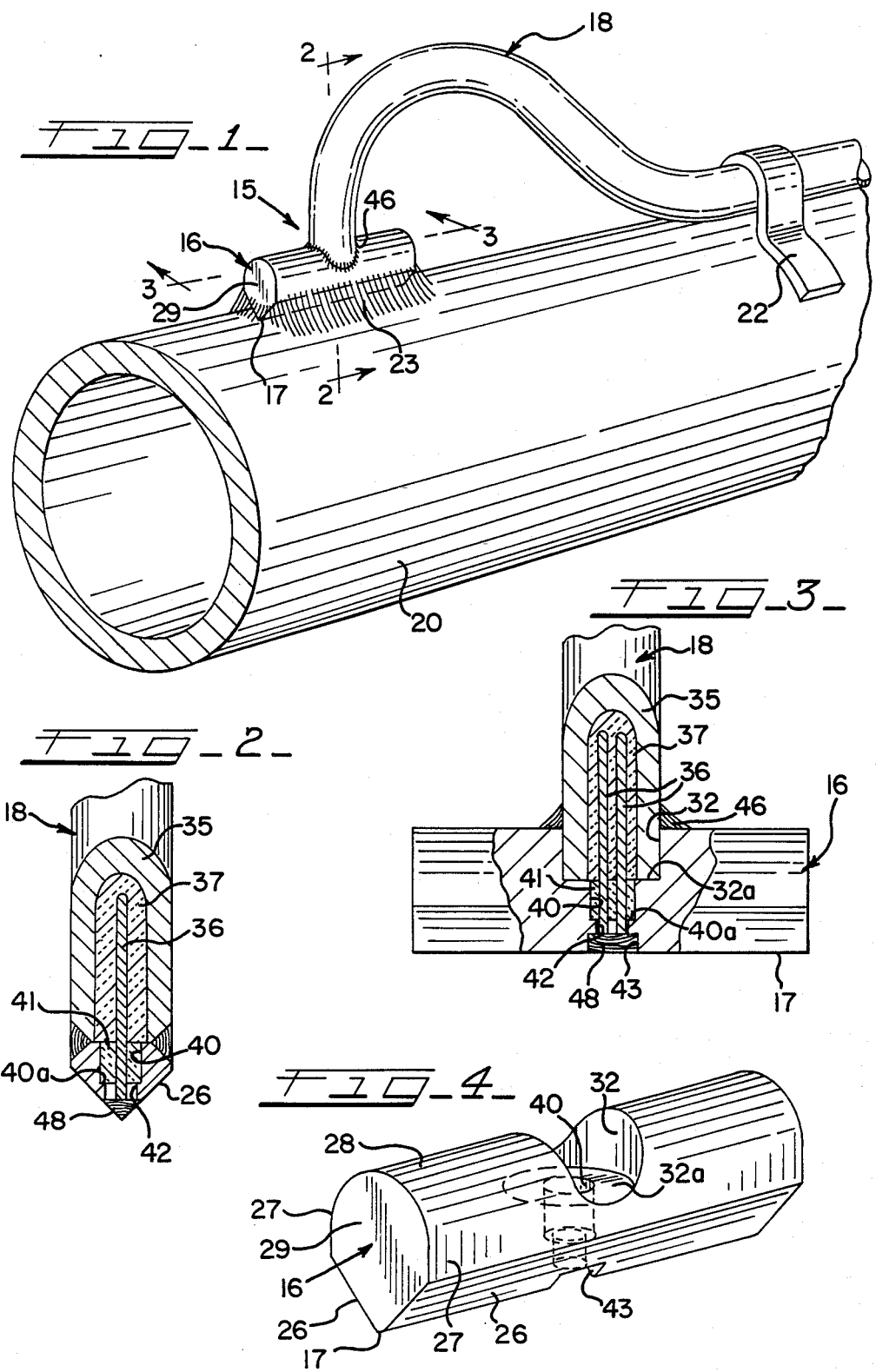

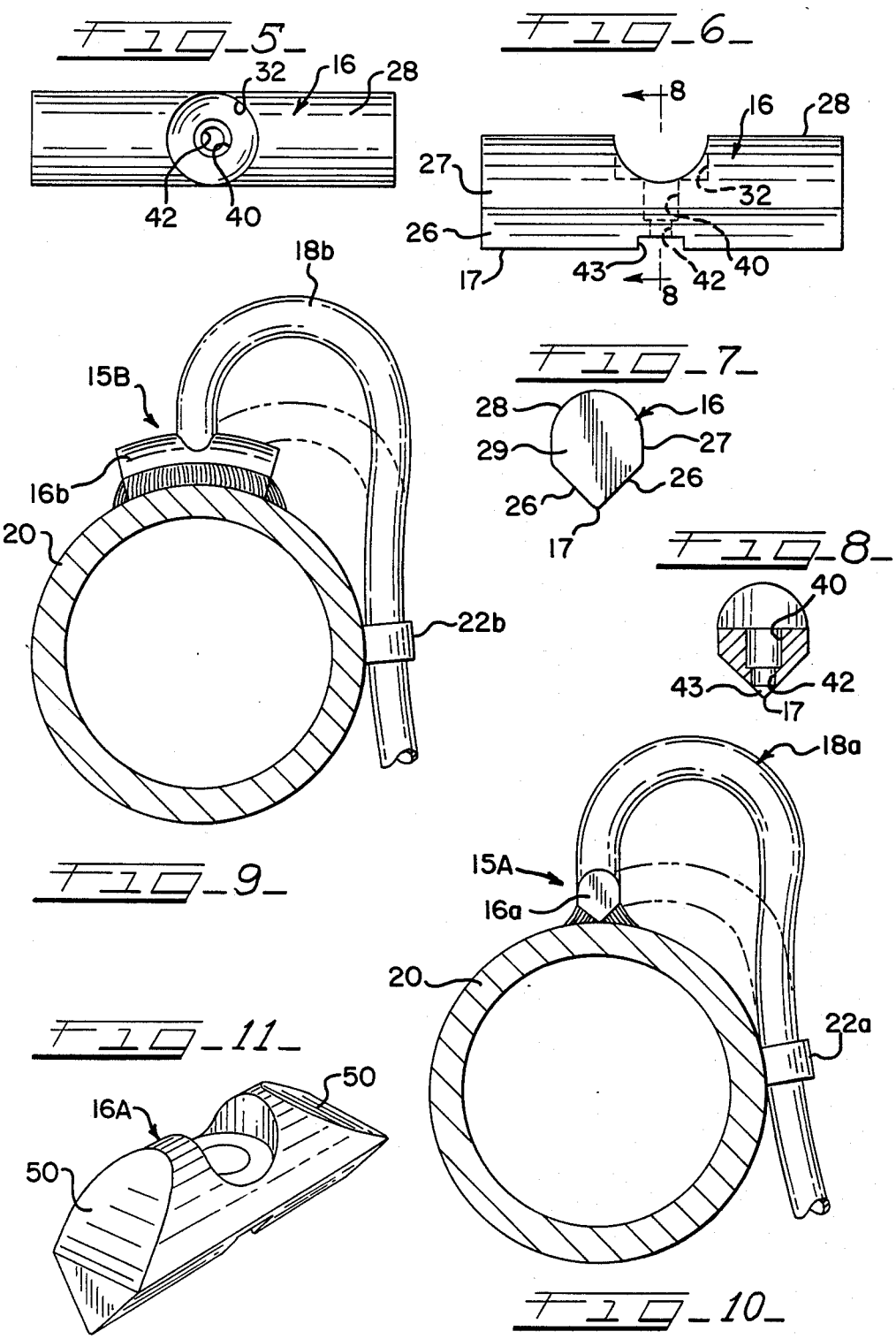

THERMOCOUPLE ASSEMBLY

DESCRIPTION

This invention relates in general to a thermocouple assembly, and more particularly to a thermocouple assembly for mounting onto a surface, the temperature of which is to be sensed, and still more particularly to a thermocouple assembly having its hot junction disposed such that when the assembly is welded in place on the surface of which the temperature is to be sensed, highly accurate temperature measurements are obtained.

BACKGROUND OF THE INVENTION

The present invention is an improvement over the thermocouple assembly disclosed in my earlier U.S. Pat. No. 3,874,239 in that the present invention is structured so that it can be inexpensively manufactured and yet provide an assembly that will provide the most accurate temperature sensing of the surface on which it is mounted. The thermocouple assembly in the aforesaid patent, while capable of providing accurate temperature measuring of a surface on which it is mounted, is costly to manufacture because it requires particular metal cutting and machining operations of the end of a sheath of thermocouple conductors, special handling of the conductors to maintain insulative conditions between the conductors up to the junction, and the adding of weldments to the sheath and thereafter the machining of the weldments in order to obtain a knife-edge configuration. Thus, the thermocouple head structure in the assembly of the above patent is difficult and expensive to make.

SUMMARY OF THE INVENTION

The present invention overcomes the construction difficulties heretofore encountered and provides a thermocouple assembly that not only is at least as accurate as that disclosed in the above patent, but also which can be more easily and economically made, thereby materially reducing the cost of the assembly. More particularly, the assembly of the invention includes a solid thermocouple head that may be mass produced from standard bar stock where it may be machined by automatic machining apparatus. The machining operations include formation of the knife edge, and the formation of openings and holes through the head for permitting the assembly therewith of sheathed thermocouple conductors and the fashioning of a welded junction at the knife edge. Alternately, the head may be extruded for outside shape and machined, or investment cast. Thereafter, the sheathed conductors may be connected to the head and the ends junction welded. Accordingly, it is not necessary to add metal by weldments to a sheath and thereafter machine those weldments to form the knife edge as is the case in the assembly disclosed in the aforesaid patent. Yet, in the structure of the present invention the construction of the junction location is disposed at the knife edge and engages the surface for which the temperature is to be measured so that the assembly can produce the most accurate temperature readings of that surface. The structure also results in improving the heat energy path to the tube on which the assembly is mounted, thereby improving temperature accuracy. It has been found that the cost of manufacturing the present invention is about one-half of the cost of making an assembly having a construction like that in the aforesaid patent.

It is therefore an object of the present invention to provide a new and improved thermocouple assembly for sensing surface temperatures which can be easily and economically manufactured at a cost much less than prior known assemblies.

Another object of the present invention is in the provision of a thermocouple assembly including a solid metal head prepared for mounting thereon sheathed thermocouple conductors and for disposing the hot junction along a knife edge that is secured in engagement with the surface for which the temperature is to be measured.

A still further object of the invention is to provide a new and improved thermocouple assembly having an improved heat energy path to the surface being measured, thereby improving accuracy of temperature measurements.

Other objects, features and advantages of the invention will be apparent from the following detailed disclosure, taken in conjunction with the accompanying sheets of drawings, wherein like reference numerals refer to like parts, in which:

BRIEF DESCRIPTION OF THE DRAWINGS

FIG. 1 is a perspective view of a thermocouple assembly according to the present invention shown in mounted and installed position on the surface of a fragmentary heat exchanger tube and where the head of a thermocouple assembly is arranged axially of the longitudinal axis of the tube;

FIG. 2 is a transverse sectional view taken through the thermocouple assembly in FIG. 1 and along the hot junction generally along line 2—2 thereof and omitting the tube and weldments;

FIG. 3 is a longitudinal sectional view taken through the assembly of FIG. 1 along the hot junction and generally along line 3—3 thereof and particularly through the area where the sheathed conductors are disposed and also illustrating the hot junction;

FIG. 4 is an enlarged perspective view of the thermocouple head with the sheath openings and bores partially shown in phantom prior to the mounting of the sheathed conductors;

FIG. 5 is a top plan view of the thermocouple head shown in FIG. 4;

FIG. 6 is a side elevational view of the thermocouple head;

FIG. 7 is an end elevational view of the thermocouple head;

FIG. 8 is a transverse vertical cross sectional view taken substantially along line 8—8 of FIG. 6;

FIG. 9 is a sectional view taken through a heat exchanger tube and showing mounted thereon a modified thermocouple assembly and mounting arrangement where the head extends circumferentially of the tube and perpendicular to the longitudinal axis, and also illustrating in phantom an alternate entry point to the thermocouple head for the sheath; and FIG. 10 is a sectional view of a tube like that in FIG. 9 and showing another modified mounting arrangement where the sheath is connected so that it extends perpendicular to the heat exchanger tube rather than longitudinally as shown in FIG. 1, and also illustrating in phantom an alternate entry point to the thermocouple head for the sheath; and FIG. 11 is a perspective view of a modified thermocouple head having the upper opposite end reformed to reduce the receptor area.

DESCRIPTION OF THE PREFERRED EMBODIMENTS

Referring now to the drawings, and particularly to FIGS. 1 to 3, the thermocouple assembly of the present invention, generally indicated by the numeral 15, includes generally a thermocouple head 16 having a knife edge 17 and a sheathed conductor line 18 sometimes called the thermocouple sheath. It will be understood that the sheath 18 will be extended through the wall of a furnace within which the assembly is mounted on a tube and then to a suitable temperature readout instrument. The conductors at the instrument constitute the cold junction end of the assembly. As seen particularly in FIG. 1, the thermocouple head 16 is mounted onto the outer surface of a heat exchanger tube 20 such that the knife edge extends parallel to the longitudinal axis of the tube, although it may be otherwise mounted as seen in FIG. 9, and the sheath 18 enters the head from the top side, is bent over and then extends longitudinally along the tube, although it may extend transverse of the tube, as seen in FIG. 10. A clip 22 holds the sheath onto the tube, and between the clip and the head a looped portion is provided so that the sheath can make a perpendicular entry to the head. The head is welded to the tube around its entire periphery by weldments 23 in a similar fashion to the welding of the thermocouple assembly to the tube wall, as illustrated in the aforesaid patent.

It should be appreciated that the thermocouple assembly is intended for monitoring the temperature of heat exchanger tubes so that the furnace can be operated at the optimum efficiency to realize fuel savings and so that damage or injury to the heat exchanger tubes due to overheating can be avoided, thereby enhancing tube life. Accordingly, maximum safety and efficiency is achieved for operating the heat exchanger tubes which would be located inside a heater or furnace and subjected to high temperature combustion gases and flame, it being the purpose to transmit heat to whatever is carried through the tubes.

The thermocouple head 16 is in the form of an elongated v-shaped block and is of solid metal of a suitable type which may be machined from round bar stock, extruded and machined, or cast such that it has a suitable length for providing an entry for the sheathed conductors. The manner of fabricating the head will allow it to be mass produced at the lowest possible cost. The knife edge is defined by lower upwardly and outwardly inclined faces 26 which then merge with short vertical faces 27 that in turn merge with an upper rounded semi-circular face or surface 28. Opposite end walls or faces 29 complete the formation of the head. Other than providing the inclined weld faces 26, the cross section may be shaped as desired. It may be appreciated that the heads may be machined or extruded in multiples to be mass produced at relatively low cost. As seen particularly in FIGS. 4, 5, 6 and 8, a sheath entry bore 32 in this embodiment is sized to have mating therewith the external surface of the sheath 18. As seen particularly in FIG. 3, the sheathed conductors 18 include an outer metal sheath 35 within which are included a pair of suitable thermocouple conductors 36 that are electrically insulated from each other and from the sheath 35 by means of a suitable insulation 37 such as magnesium oxide, aluminum oxide, or beryllium oxide. Such insulating oxides are initially provided in granular or powdered form and compacted within the sheath and around the conductors so that they are fully supported relative to one another and to the sheath, and so that any space is eliminated within the sheath that would allow the passage of gases which could be deleterious to the conductors and the junction.

The diameter of the entry bore 32 is such that it provides a seat or shoulder 32a for the end of the sheath 35 as illustrated in FIG. 3, and at a position substantially centrally between the ends and between the top surface and the knife edge. Extending downwardly from the entry bore 32 and centrally thereof is a first counterbore 40 terminating in a shoulder 40a and providing an area within which the conductors 36 are received and insulated from each other by a suitable oxide insulation 41. While counterbore 40 is illustrated as having an insulation, it could alternatively be void of oxide insulation wherein the conductors would only be insulated by an air space. A second counterfore 42 extends downwardly from the counterbore 40 and opens into the transverse weld junction slot 43 formed through the knife edge and the inclined faces 26.

Assembly of the sheathed conductors with the thermocouple head and construction of the thermocouple assembly involves taking a length of sheathed conductors, cutting back from the end through the sheath to bare a length of conductors, removing the insulation, inserting the sheathed conductors into the entry bore until the sheath sits on the entry bore shoulder 32a, as shown in FIG. 3. Thereafter, the sheath is welded to the thermocouple head by a circumferential weld 46. Next, granular oxide insulation is packed into the cavity defined then by the end of the sheathed conductor assembly and the first counterbore 40 so that the insulation 41 will electricially isolate the portion of the conductors passing through the first counterbore from each other and from the thermocouple head. Alternatively, the insulation could take the form of a preformed vitrified insulator having conductor holes and be preplaced prior to inserting the sheathed conductors into the entry bore. Further, as above noted, the insulator could be omitted. A portion of the conductors passing through the second counterbore are then maintained in spaced relation from each other and in spaced relation from the wall of the counterbore wherein at this area the conductors are insulated from each other by air only. The ends of the conductors are then welded together to define the welded hot junction 48 by filling the slot 43 with weldments and around the ends of the conductors. The conductors freely disposed in the second counterbore are supported above by the insulation and below by the welded junction so that they maintain spacing between each other and from the head. Thereafter, any excess welding material extending beyond the faces 26 may be suitably removed in order to make the faces flat. However, it is not necessary to remove the excess material as eventually when the thermocouple assembly is mounted on a tube, the entire area along the faces will be welded to the heat exchanger tube, as shown in FIG. 1. Additionally, a part of the end faces 29 will also be welded to the heat exchanger tube.

It will be appreciated that the sheath entry to the thermocouple head in the embodiment of FIG. 1 is such that it is directly opposite to the V portion of the head and the knife edge 17. It may be otherwise disposed relative to the V portion as will be hereinafter explained with respect to the embodiment of FIG. 10 as shown in phantom. Further, the manner in which the sheathed conductors are arranged relative to the thermocouple head 16 in the embodiment of FIG. 1 is such that the sheath 18 extends in a parallel relation to the head. However, it may also be disposed relative to the head in other arrangements such as shown in FIG. 10. The relationship between the sheath and the head will depend upon the installation as dictated by the construction of the furnace.

When mounting the embodiment of FIG. 1 on a heat exchanger tube, the head is disposed in parallel relation to the longitudinal axis of the tube and along the outer surface. Thereafter, the head is welded to the tube, the largest weldments being between the inclined weld faces 26 and the tubes. After the head is welded in place, the sheath is then bent to form the loop and then arranged along the tube and secured in place by the clip 22.

An alternative mounting arrangement is shown in FIG. 10, wherein the assembly generally is designated as 15A and where the sheath entry is in the same position as shown in solid lines as in the embodiment of FIG. 1 but where the sheath is bent in a perpendicular position relative to the thermocouple head 16a so that the sheath 18a can extend downwardly along the side of the heat exchanger tube 20 and be fastened to the side of the tube by a clip 22a. Again, a loop is defined between clip 22a and the entry point of the thermocouple head 16a. Alternately, the entry point to the thermocouple head may be from the side so that the size of the loop can be decreased for the sheath as illustrated in phantom, and in this event the conductors will be bent as they extend through the head to the hot junction.

A modification of the invention is shown in FIG. 9 wherein the thermocouple assembly, generally designated by the numeral 15B, includes a solid thermocouple head 16b which differs from the thermocouple head 16 in that the knife edge is formed along a radius to mate with the radius of the heat exchanger tube 20 and allow the head to be disposed in a circumferential fashion with the tube or at a perpendicular position with respect to the longitudinal axis of the tube. The entry point for the sheath 18b will be directly opposite the knife edge but may come out in a perpendicular relation to the thermocouple head as shown in solid lines or at an acute angle as shown in phantom before being trained down alongside of the tube and secured thereto by the clip 22b. Again, the clip is intended to hold the sheath in contact with the tube for the purpose of transferring heat from the sheath to the tube in order to reduce the effect on the accuracy of the assembly and to reduce the heat level for the sheath. Also, it will be appreciated that the clip serves to relieve mechanical stress of the sheath. As in the other embodiments, the thermocouple head 16b includes inclined weld surfaces for welding the head to the tube.

A modified head 16A is shown in FIG. 11 which differs from head 16 in that the upper opposed ends have been revised to reduce the receptor area and effectively remove an energy receptor fin. Thus, the corners have been removed defining flat oppositely downwardly inclined surfaces 50. By removal of the energy receptor, the area for energy reception from the combustion gases and flames is materially reduced, thereby reducing the transfer of energy to the head which tends to distort the temperature of the tube surface at the hot junction. Accordingly, the reading will be better representative of actual tube surface temperature.

As already mentioned, the heat exchanger tube, as well as the thermocouple tube, are subjected to high temperature, combustion gases and flame. The manner in which the thermocouple head is mounted onto the tube controls the heat energy path to assist in transferring heat to the tube where the path is increased in area over the assembly in the above patent as the heat energy can go straight through the head around the area connected to the sheath and through the welded areas such that the heat energy path has a minimum effect on the hot junction located at the knife edge whereby the location permits the junction to respond to the temperature representative of actual heat exchanger tube wall temperature. Accordingly, the most accurate tube wall temperature measurements possible are produced.

It will be understood that modificatons and variations may be effected without departing from the scope of the novel concepts of the present invention, but it is understood that this application is to be limited only by the scope of the appended claims.

The invention is hereby claimed as follows:

1. A thermocouple assembly for measuring the temperature of a heat exchanger tube subjected to high temperature combustion gases and flame having a hot junction at the tube and a cold junction remotely located and connected to a readout instrument comprising, an elongated thermocouple head having an elongated heat transmitting surface adapted to be in engagement with the tube and a plurality of weld faces adjacent said surface that are adapted to be welded to the tube, and a sheathed thermocouple conductor assembly fixed to said head, said thermocouple assembly having a sheath, a pair of thermocouple conductors therein and means insulating the conductors from each other and from the sheath, said head having a sheath assembly entry opening into which the sheath extends, an opening through said surface in communication with said entry opening, a weldment filling said opening in said surface and welding the ends of the conductors together and in place and defining the hot junction at said surface, whereby the hot junction is thereby disposed at said surface of the tube.

2. The thermocouple assembly of claim 1, wherein the entry opening for the sheath assembly is directly opposite said heat transmitting surface.

3. The thermocouple assembly of claim 2, wherein the conductors of said sheath assembly extend throughout their length in said head at right angles to the longitudinal axis of the head.

4. The thermocouple assembly of claim 1 wherein the entry opening for the sheath assembly is along one side of the upper portion of the head.

5. The thermocouple assembly of claim 1, wherein the heat transmitting surface is straight to permit the head to be mounted longitudinally of said tube.

6. The thermocouple assembly of claim 1, wherein the heat transmitting surface is curved to permit the head to be mounted transversely of said tube.

7. The thermocouple assembly of claim 1, which further includes means in said counterbore insulating said conductors from each other and from the head.

8. The thermocouple assembly of claim 7, wherein said insulating means comprises a vitrified body having holes through which said conductors extend.

9. The thermocouple assembly of claim 7, wherein said insulating means comprises granular oxide.

10. The thermocouple assembly of claim 9, wherein the opposed upper ends of the head include downwardly inclined surfaces.

11. The thermocouple assembly of claim 7, wherein said insulating means comprises air space.

12. The thermocouple assembly of claim 1, wherein the thermocouple head is formed to reduce the energy receptor area at the opposed upper ends.

13. A thermocouple assembly according to claim 1 comprising
   an annular seat in said head facing toward said entry opening,
   one end portion of said sheath being disposed in said entry opening with the corresponding end of said sheath abutting said annular seat, and
   a second weldment welding said sheath to the external surface of said head to sealably affix said sheath to said head.

14. A thermocouple assembly according to claim 13 comprising
   an annular shoulder in said head disposed between said annular seat and said opening through said surface and facing toward said opening through said surface, and
   said weldment filling said opening in said surface abutting said annular shoulder.

15. A thermocouple assembly according to claim 14 wherein
   said entry opening and said opening in said surface are coaxial.

16. A surface thermocouple assembly for monitoring the temperature of a surface to which it is attached wherein one end of the assembly is a cold junction end for connection to a temperature readout instrument and the other end is a hot junction end, said assembly comprising, an elongated tubular metal sheath and a surface mountable elongated V-block, a pair of spaced thermocouple conductors within the sheath, electrical insulating material spacing and supporting said conductors within the sheath in insulating relation from each other and from the sheath, said conductors at the cold junction end adapted to be connected to the readout instrument, said V-block having V-related mounting surfaces defining an elongated heat transmitting surface for engagement with the fire side of a tube, an entry opening extending transversely to said heat transmitting surface in said block for receiving said sheath, an opening through said surface communicating with said entry opening, and a weld junction in said opening forming the hot junction.

17. A thermocouple assembly for measuring the temperature of a heat exchanger tube subject to high temperature combustion gases comprising in combination
   an elongate metallic head member having an elongate heat transmitting surface adapted to be in engagement with said tube,
   a straight bore extending transversely through said head between said heat transmitting surface and the side of said head member opposite to said heat transmitting surface,
   a sheathed thermocouple assembly having a metal sheath, a pair of thermocouple conductors in said sheath, and means insulating said conductors from one another and from said sheath,
   said sheathed thermocouple assembly extending into said opening from the side of said head member opposite to said heat transmitting surface,
   a first weldment fixedly welding said sheath to said head member,
   a second weldment in the end of said bore adjacent to said heat conducting surface,
   said second weldment welding the distal ends of said conductors together and to said head member at said heat transmitting surface, thereby to provide a hot junction at said heat transmitting surface.

* * * * *